Jan. 25, 1938.     F. R. MOORE     2,106,574
LIQUID LEVEL INDICATOR
Filed Nov. 25, 1936
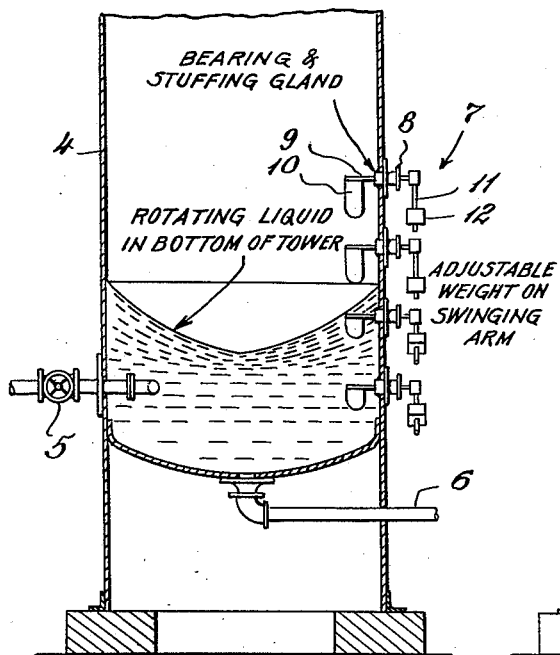
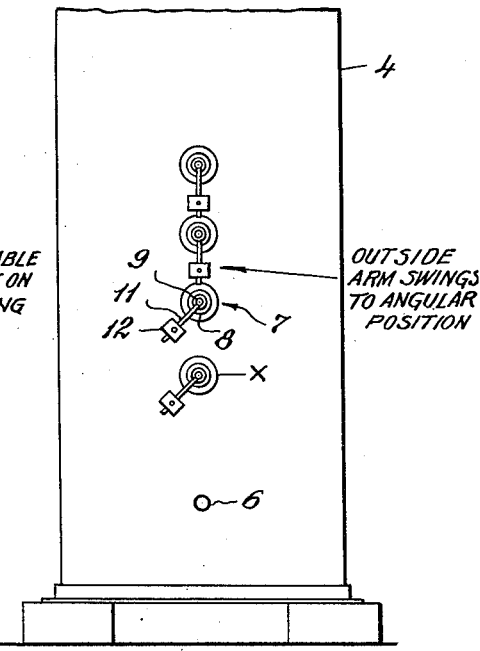
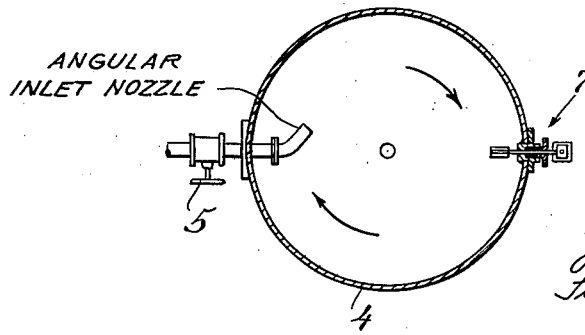
Francis Reed Moore
INVENTOR
BY Myron J. Burkhard
ATTORNEY Patented Jan. 25, 1938

2,106,574

UNITED STATES PATENT OFFICE 2,106,574

LIQUID LEVEL INDICATOR

Francis Reed Moore, Augusta, Kans., assignor to Socony-Vacuum Oil Company, Incorporated, New York, N. Y., a corporation of New York Application November 25, 1936, Serial No. 112,695

3 Claims. (Cl. 73—290)

This invention is directed to devices for indicating the level of liquid within closed containers, and more particularly toward devices for indicating the level of a liquid which is moving rapidly within the container.

In many instances, as in agitators, wherein liquids are mixed, and in vapor separators, as in many separators used for various purposes in the petroleum oil refining industry, the liquids are moving with a swirling circumferential motion, and this invention is particularly concerned with a liquid level indicating device adapted to take advantage of this motion. In vapor separators used in the petroleum refining industry, the incoming stream of oil and vapor is usually introduced below the surface of the liquid, through a tangentially placed inlet pipe, in order that the liquid in the separator may be continuously agitated to prevent settling and deposition of coke with consequent clogging of the outlet. Such separators are commonly operated at high temperatures, frequently under pressure either greatly above or greatly below atmospheric pressure, and gauge glasses of the usual type are not applicable thereto. Since the hot oil tends to deposit coke on standing and frequently is highly viscous when cold, petcocks or trycocks for determining liquid level are not entirely trustworthy, and do not give a visual indication of level. Due to these same difficulties, more complicated types of visual level indicators are also somewhat untrustworthy, and frequently difficult to maintain.

The object of this invention is to devise a means for indicating the level of liquid within containers in which the liquid is in motion, said means being actuated by the motion of the liquid.

In order that this invention may be understood, reference is made to the drawing attached to this specification, in which Figure 1 shows a vertical section of an oil evaporator to which the invention is applied, Figure 2 shows a side view thereof, and Figure 3 shows a view in plan. In these figures, like parts are identified by like numerals. In the drawing, 4 indicates the shell of an evaporator, into which a mixture of hot oil and vapor is introduced by inlet pipe 5, so arranged that the oil in the evaporator is given a swirling circumferential motion, as indicated by the arrows in Figure 3. Vapors separated in the evaporator pass upwardly, and liquid hot oil is removed by pipe 6. The swirling liquid assumes a conical surface, as indicated in Figure 1. In such instances it is not important that the amount of liquid in the evaporator be known with absolute accuracy, but it is highly important that it be known with relative accuracy. To accomplish this, I place a plurality of indicating devices 7 in the side of the evaporator, spaced in line, spirally, or otherwise, at different levels. Each indicator 7 consists of a stuffing box 8, through which passes a shaft 9. To the inboard end of this shaft a vane 10 is firmly attached. The outboard end of shaft 9 carries an arm 11, which is firmly attached in a position aligned with vane 10. Near the end of arm 11, there is placed an adjustable weight 12 of such magnitude that the vane, weight, and arm normally will hang downward, and when the vane is submerged in moving liquid will be displaced to one side. In operation a series of these indicators, upon the side of vessel, as shown in Figure 2, will indicate the level of the liquid therein, the upper indicators, whose vanes are not submerged, hanging vertically, and the lower indicators, whose vanes are submerged, being displaced to one side.

While a specific form of construction is shown herein by way of example, it is obvious that other forms may occur to those skilled in the art. I regard such variations as equivalents, and claim them as my invention, subject to the limitations expressed in the following claims.

I claim:

1. A device for indicating the level of a moving liquid within a vessel, comprising means within the vessel adapted to be angularly displaced from a normal position when submerged within a moving liquid, means without the vessel to indicate the displacement of the internal means, means connecting the internal displaced means and the external indicating means, and weight means, external to said vessel, acting to prevent displacement of said internal means when unsubmerged or when submerged in a substantially motionless liquid.

2. A device for indicating the presence of moving liquid at a predetermined level within a vessel comprising a stuffing box in the wall of said vessel located near said level, a shaft passing therethrough, a vane mounted upon the inboard end of the shaft in such manner as to depend into the liquid and be angularly displaced thereby, weight means on the outboard end of the shaft so mounted as to prevent displacement of the vane except in the presence of a moving liquid, and means actuated by the outboard end of the shaft to indicate the angular displacement of said vane.

3. Means for indicating the level of a moving liquid within a vessel comprising a plurality of indicators located at spaced vertical positions in the sidewall of said vessel, each indicator comprising a stuffing box inserted in the vessel wall, a shaft passing therethrough, a vane attached to the inner end of the shaft to depend into the liquid and be angularly displaced thereby, adjustable weight means on the outboard end of the shaft to prevent displacement of such vane except by moving liquid, and means actuated by the outer end of the shaft to indicate the angular displacement of said vane.

FRANCIS REED MOORE.